United States Patent [19]

Nakajima et al.

[11] 4,448,356

[45] May 15, 1984

[54] DOUBLE-INJECTION TYPE FUEL INJECTION VALVE

[75] Inventors: Nobuyuki Nakajima; Katumi Hiruma, both of Matsuyama, Japan

[73] Assignee: Diesel Kiki Co., Ltd., Tokyo, Japan

[21] Appl. No.: 361,583

[22] Filed: Mar. 24, 1982

[30] Foreign Application Priority Data

Apr. 3, 1981 [JP] Japan .............. 56-47356[U]

[51] Int. Cl.³ .......................................... F02M 45/08
[52] U.S. Cl. ............................. 239/533.5; 239/533.9
[58] Field of Search ................... 239/533.2–533.12, 239/584

[56] References Cited

U.S. PATENT DOCUMENTS

| | | | |
|---|---|---|---|
| 1,735,718 | 11/1929 | Attendu | 239/533.5 |
| 2,626,186 | 1/1953 | Nakken | 239/533.6 |
| 2,921,746 | 1/1960 | Burman | 239/584 |
| 4,359,191 | 11/1982 | Uchida | 239/533.5 |
| 4,390,129 | 6/1983 | Uchida | 239/533.5 |

FOREIGN PATENT DOCUMENTS

| | | | |
|---|---|---|---|
| 972143 | 1/1951 | France | 239/533.5 |
| 994588 | 11/1951 | France | 239/533.5 |
| 54-3224 | 2/1979 | Japan | 239/533.5 |
| 736794 | 9/1955 | United Kingdom | 239/533.2 |

*Primary Examiner*—John J. Love
*Assistant Examiner*—Michael J. Forman
*Attorney, Agent, or Firm*—Frishauf, Holtz, Goodman & Woodward

[57] ABSTRACT

A fuel injection valve which is adapted to carry out fuel injection in a double-step manner such that lifting of the nozzle needle through the initial injection stroke causes contraction of a first nozzle spring and subsequent lifting of the nozzle needle through the main injection stroke causes contraction of a second nozzle spring as well as the first nozzle spring. A first adjusting threaded member threadedly engages the nozzle holder and accommodates a second movable spring seat, the second nozzle spring urging the former, and a second adjusting threaded member for adjusting the setting load of the second nozzle spring. The first adjusting threaded member is disposed in urging contact with the first nozzle spring for adjustment of its setting load through its rotative displacement, independently of adjustment of the setting load of the second nozzle spring which is made by the second adjusting threaded member. A shim is interposed between the second movable spring seat and a seating surface of the first adjusting threaded member, the thickness of which determines the initial insection lift and is adjusted in dependence on the relationship between the distance between the first movable spring seat in its seated position and the first adjusting threaded member, and the length of a predetermined portion of the second movable spring seat.

4 Claims, 1 Drawing Figure

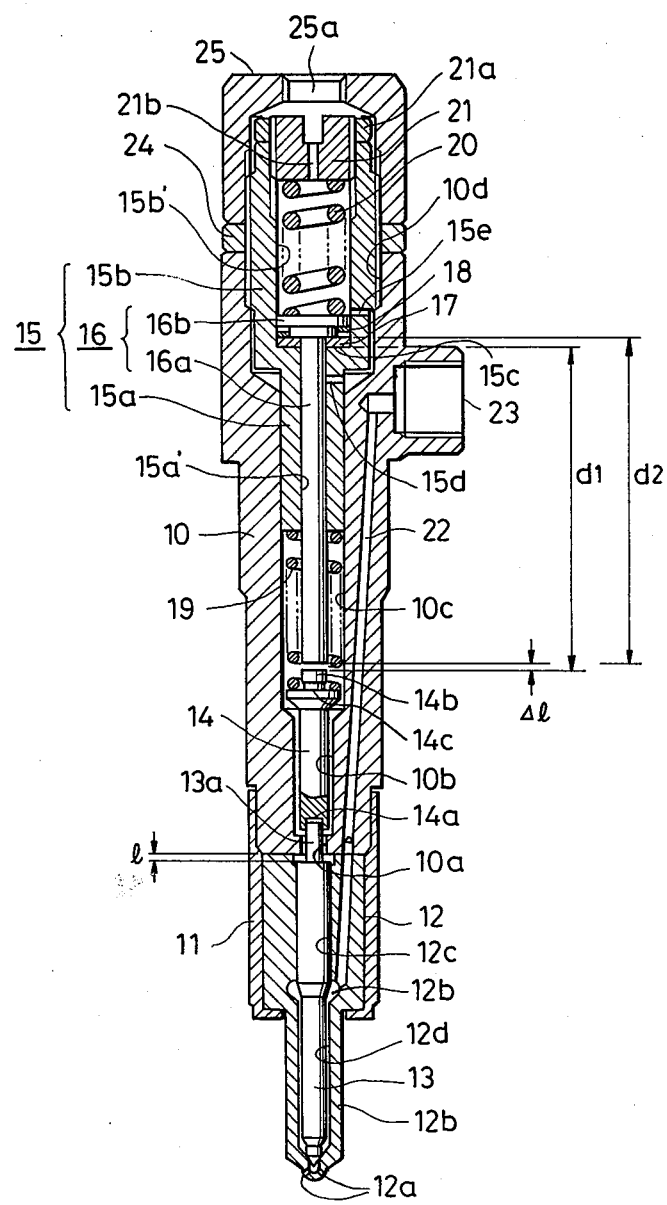

DOUBLE-INJECTION TYPE FUEL INJECTION VALVE

BACKGROUND OF THE INVENTION

The present invention relates to a fuel injection valve for use in a direct-injection type internal combustion engine.

In a conventional diesel engine, there is a problem that while the fuel injection rate, i.e., injection quantity per unit time should be set at a suitably high value for improvement of the output characteristic of the engine as well as prevention of the emission of nitrogen oxides and other detrimental products, an increased fuel injection rate can lead to a correspondingly shortened injection period, which can cause a reduction in the combustion duration, resulting in a combustion noise, and can also cause an increase in maximum pressure within the engine cylinders.

On the other hand, in a conventional fuel injection valve used in such conventional diesel engine, the nozzle needle is urged by a single spring, so that the valve operation is monotonously affected by pressure changes within the injection pipe connected to the valve, that is, a specific amount of increase in the pressure within the injection pipe causes the same amount of increase in the lift of the nozzle needle in a lower injection quantity range as in a higher injection quantity range. Therefore, in a lower injection quantity range, the nozzle needle can lift through an excessive stroke to provide an excessive injection quantity due to an increase in the pressure within the injection pipe, and the resulting pressure drop in the injection pipe causes a too small injection quantity during the next injection stroke, followed by an excessive injection quantity during the further next injection stroke. In this manner, the fuel injection valve suffers an unstable or irregular injection. Although a conventional fuel injection valve using a pintle nozzle can overcome such phenomenon of unstable or irregular injection due to the shape of its nozzle needle which produces a throttling effect, one using a hole nozzle is unable to avoid the abovementioned phenomenon.

To solve this problem, a fuel injection valve has been proposed by the assignee of the present application in U.S. Ser. No. 237,941 filed Feb. 25, 1981 now U.S. Pat. No. 4,359,191, issued Nov. 16, 1982 for instance, which includes a second nozzle spring arranged in its nozzle holder in addition to a conventionally employed first nozzle spring. In this proposed fuel injection valve, fuel injection takes place in two steps, i.e., an initial injection and a main injection, in such a manner that during the initial injection the first nozzle spring operates wherein the nozzle needle lifts through a limited stroke, and the main injection subsequently takes place with the valve opening pressure determined by the combined force of the first and second nozzle springs. This double-step injection reduces the injection rate throughout the whole injection period, thus substantially overcoming all the aforementioned drawbacks of combustion noise, emission of nitrogen oxides and irregular injection.

According to the above proposed fuel injection valve, during the initial injection lifting of the nozzle needle causes corresponding lifting of a first movable spring seat to cause contraction of the first nozzle spring to execute an initial injection lift, and during the subsequent main injection the first movable spring seat is further lifted to push a rod-like second movable spring seat to cause contraction of the second nozzle spring together with the first nozzle spring to execute a main injection lift.

The valve opening pressure for initial injection is determined by the setting load of the first nozzle spring for initial injection, and the valve opening pressure for main injection by the sum of the setting loads of the first nozzle spring and the second nozzle spring for main injection, respectively.

However, according to this proposed fuel injection valve, adjustment of the setting load of the first nozzle spring is carried out by selecting the thickness of a shim interposed between the same spring and its seating surface formed in the nozzle holder, which requires dismantling the injection nozzle portion of the valve each time the initial injection valve opening pressure and the main injection valve opening pressure are adjusted. Further, according to the proposed valve, to adjust the initial injection lift, an adjusting threaded member is rotated to displace the second movable spring seat engaged therewith to vary the gap between the first movable spring seat and the second movable spring seat. However, once the initial injection lift gap has been adjusted, it is difficult to ascertain whether or not the adjusted gap has an accurate value. In addition, like ordinary threaded parts, small tolerances exist between the thread formed on the outer peripheral surface of the adjusting threaded member and the thread formed on the associated inner peripheral surface of the nozzle holder, which may result in play of the threaded member relative to the nozzle holder. This play of the threaded member makes it difficult to make accurate adjustment of the initial injection lift gap.

OBJECTS AND SUMMARY OF THE INVENTION

It is an object of the invention to provide a fuel injection valve which permits accurate adjustment of the setting load of the first nozzle spring without dismantling the injection nozzle portion, thereby enabling accurate setting of the valve opening pressure for initial injection and one for main injection in a prompt manner.

It is a further object of the invention to provide a fuel injection valve which permits adjusting the lift of the nozzle needle for initial injection from outside, with ease and accuracy.

The present invention provides a double-injection type fuel injection valve which comprises a first adjusting threaded member threadedly engaging the nozzle holder and rotatable relative thereto for axial displacement. The first adjusting threaded member has an internal space opening at one end in an end face of said first adjusting threaded member remote from the injection nozzle. Accommodated within the internal space are a second movable spring seat extending in part through another end of the first adjusting threaded member facing toward the injection nozzle and a second nozzle spring urging the second movable spring seat in a direction toward the injection nozzle. The other end of the first adjusting threaded member facing toward the injection nozzle is disposed in urging contact with one end of a first nozzle spring. A second adjusting threaded member is threadedly fitted in the open end of the internal space of the first adjusting threaded member for axial rotative displacement and urging the second nozzle spring.

Axial rotative displacements of the first adjusting threaded member and the second adjusting threaded member cause changes in the setting load of the first spring and that of the second spring, respectively. Thus, the setting loads of the first and second nozzle springs can be adjusted in a manner independent of each other by rotating the first adjusting threaded member and the second adjusting threaded member, respectively.

The fuel injection valve according to the present invention further includes a shim interposed between the second movable spring seat and its seating surface in the internal space of the first adjusting threaded member to determine the seating position of the second movable spring seat relative to the first movable spring seat. The thickness of the shim is adjusted so as to provide a desired initial injection lift gap between the first and second movable spring seats and selected as a function of the difference between the distance between a predetermined point on the first movable spring seat in its seated position and a predetermined point on the first adjusting threaded member and the length of a predetermined portion of the second movable spring seat.

The above and other objects, features and advantages of the invention will be more apparent from the ensuing detailed description taken in connection with the accompanying drawings in which:

BRIEF DESCRIPTION OF THE DRAWINGS

The drawing is a longitudinal sectional view of a double-injection type fuel injection valve according to an embodiment of the present invention.

DETAILED DESCRIPTION

The invention will be described in detail with reference to the accompanying drawing.

A nozzle body 12 is rigidly mounted on an end of a nozzle holder 10 by means of a nozzle nut 11. The nozzle body 12 has a nozzle portion 12b with a reduced diameter which has its tip formed with a plurality of injection holes 12a. A nozzle needle 13 is slidably fitted through axial bores 12c and 12d formed through the nozzle body 12, which has its tip disposed in opposed relation to the above injection holes 12a and has a journal 13a formed at its other end. The nozzle holder 10 has four axial bores 10a, 10b, 10c and 10d which are continuously formed and are gradually smaller in diameter toward the tip of the nozzle holder 10. The above journal 13a of the nozzle needle 13 is inserted in the second axial bore 10b and coupled to a first movable spring seat 14 which is slidably fitted through the same axial bore 10b, in a manner that it can be seated on a recessed needle seating surface 14a formed in the tip of the spring seat 14. The movable spring seat 14 has an end remote from the nozzle needle 13 formed integrally with an axial protuberance 14b and an enlarged spring seating portion 14c, the portions 14b and 14c being located within the third axial bore 10c.

An adjusting threaded member 15 is mounted in an end of the nozzle holder 10 remote from the nozzle body 12 in such a manner that a thin integral extension 15a is fitted in the axial bore 10c and an enlarged main body 15b which has a threaded outer peripheral surface is threadedly fitted in the axial bore 10d which has a threaded inner peripheral surface. The integral extension 15a and the main body 15b have a narrow axial through bore 15a' and an enlarged internal space 15b', respectively, which are located concentrically with each other. A second movable spring seat 16 is carried by the adjusting threaded member 15, which comprises a rod portion 16a slidably fitted in the axial through bore 15a of the adjusting threaded member 15 and a spring seating portion 16b in the form of a disc formed integrally with the rod portion 16a and slidably fitted in the internal space 15b' of the same member 15. An adjusting shim 17 and a wave washer 18 are interposed between a side surface of the spring seating portion 16b facing toward the nozzle needle 13 and a seating surface 15c in the internal space 15b, which are used to set the initial injection lift gap Δl, hereinlater referred to, to a desired or predetermined value. In place of the wave washer 18 may be used an initially coned disc spring.

A first nozzle spring 19 is interposed between a tip surface of the extension 15c of the adjusting threaded member 15 disposed in the axial bore 10c of the nozzle holder 10 and the spring seating portion 14c of the first movable spring seat 14 and urges the two members 14, 15 in opposite directions. A second nozzle spring 20 is accommodated within the internal space 15b' of the adjusting threaded member 15. An adjusting screw 21 as a second adjusting threaded member is threadedly fitted in a tapped upper end portion of the internal space 15b'. The second nozzle spring 20 is interposed between the second movable spring seat 16 and the adjusting screw 21 and urges the two members 16, 21 in opposite directions. The adjusting screw 21 is retained in its adjusted position by means of a retainer nut 21a rigidly threadedly fitted thereon. Also, the adjusting threaded member 15 is retained in its adjusted position by means of a retainer nut 24 rigidly threadedly fitted on the enlarged portion 15b of the former. Incidentally, in the figure, reference numeral 22 designates a fuel supply passage formed in a lateral wall of the nozzle holder 10 for guiding fuel supplied from a fuel injection pump, not shown, into a pressure chamber 12b formed in the nozzle body 12. Reference numeral 25 denotes a cap nut threadedly fitted on the upper threaded end portion of the adjusting threaded member 15. The adjusting threaded member 15, the second adjusting threaded member 21 and the cap nut 25 are formed with guide bores 15d, 15e, 21b and 25a through which part of fuel is returned to a fuel tank, not shown, while lubricating the parts inside the nozzle holder 10.

The manner of assembling the fuel injection valve constructed above will now be described. First, the first movable spring seat 14 is inserted into the axial bore 10b of the nozzle holder 10 after mounting the nozzle body 12 onto the latter, and brought into engagement with the nozzle needle 13 fitted in the axial bore 10a of the nozzle holder 10. Then, the first nozzle spring 19 is inserted into the axial bore 10c of the nozzle holder 10, and the adjusting threaded member 15 is mounted into the nozzle holder 10 by first inserting its thin extension 15a into the axial bore 10c and rotating the threaded member 10 so that its enlarged portion 15b is screwed into the axial bore 10d of the nozzle holder 10. On this occasion, the adjusting threaded member 15 is rotated so as to set the setting load of the first nozzle spring 19 to a desired value. After setting of the setting load of the first nozzle spring 19, the retainer nut 24 is screwed onto the adjusting threaded member 15 to lock same in its adjusted position. Then, fine measurement is carried out by the use of a simple measuring instrument, of the distance $d_1$ between the end face of the projected top 14b of the first movable spring seat 14 and the seating surface 15c in the internal space of the adjusting threaded member 15, on which the second nozzle spring 20 is to be seated. Separately from the above measurement, another measurement is carried out of the distance $d_2$ between the side face of the spring seating portion 16b of the second movable spring seat 16 facing its rod portion 16a and the free end face of the rod portion 16a, that is, the length of the rod portion 16a. Provided that the desired initial injection lift gap of this fuel injection valve is $\Delta l$, the required thickness t of the adjusting shim 17 can be determined by an equation of $t = d_2 - d_1 + \Delta l$. After determination of the thickness t, a shim 17 which has the determined thickness value is selected. The second movable spring seat 16 is then inserted into the internal space 15b' of the adjusting threaded member 15 with the selected shim 17 interposed between the lower side surface of the spring seating portion 16b of the second movable spring seat 16 and the seating surface 15c of the adjusting threaded member 15. In this manner, the initial injection lift gap $\Delta l$ can be easily set with accuracy. Thereafter, the second nozzle spring 20 is inserted into the internal space 15b' of the adjusting threaded member 15, followed by screwing the second adjusting threaded member 21 into the same space 15b'. The position of the second adjusting threaded member 21 is adjusted so that the combined setting load of the first and second nozzle springs 19, 20 satisfies a desired valve opening pressure for main injection. Then, the retainer nut 21a is screwed onto the second adjusting screw 21 to lock same in its adjusted position, followed by screwing the cap nut 25 onto the adjusting threaded member 15, thus completing the operation of assembly and adjustment.

The above-described manner of adjusting the setting loads of the first nozzle spring 19 and the second nozzle spring 20 independently of each other enables accurate setting of the initial injection valve opening pressure and the main injection valve opening pressure with accuracy and ease. Particularly, adjustment of the setting load of the first nozzle spring 19 by means of the adjusting threaded member 15 can be made merely by rotating the threaded member 15 which can be disposed to the outside, thus permitting simple manual spring load-setting operation without using any special tool.

In the above adjusting operations, if the adjusting shim 17 vibrates during setting of the setting load of the second nozzle spring 20 by means of the adjusting screw 21, a wave washer 18 as shown in the figure or an initially coned disc spring, not shown, may be interposed between the shim 17 and the lower side surface of the spring seating portion 16b of the second movable spring seat 16 in a manner fitted on a stepped shoulder of the seating portion 16b so that the adjusting shim 17 is lightly kept seated on the seating surface 15c of the internal space 15b'.

The illustrated fuel injection valve according to the present invention operates in the same manner as a conventional double-injection type fuel injection valve, as follows: Fuel is fed under pressure from a fuel injection pump, not shown, to the pressure chamber 12b in the nozzle body 12 through the fuel supply passage 22 in the nozzle holder 10. When the fuel pressure exceeds the setting load of the first nozzle spring 19 which is set to a predetermined value as previously mentioned, the needle valve 13 is forcedly lifted to lift the first spring seat 14 through the preset initial injection lift $\Delta l$, causing fuel injection through the injection holes 12a through the initial injection stroke with a relatively low injection quantity. Thereafter, when the fuel pressure exceeds the combined force of the first and second nozzle springs 19, 20, the nozzle needle 13 and the first movable spring seat 14 are further lifted to lift the second movable spring seat 16 through the main injection lift $l - \Delta l$, thus executing the main injection stroke with a relatively large injection quantity.

While the invention has been particularly shown and described with reference to a preferred embodiment thereof it will be understood by those skilled in the art that any changes and variations can be made therein without departing from the spirit and scope of the invention.

What is claimed is:

1. A fuel injection valve comprising: an injection nozzle having a nozzle needle liftable in response to fuel pressure; a nozzle holder supporting said injection nozzle; a first spring arranged within said nozzle holder; a first movable spring seat coupled to said nozzle needle and supporting said first spring; a first adjusting threaded member threadedly engaging said nozzle holder in a direct manner, said first adjusting threaded member defining therein an internal space opening at one end in an end face of said first adjusting threaded member remote from said injection nozzle, said first adjusting threaded member having another end facing toward said injection nozzle and disposed in urging contact with said first spring, said first adjusting threaded member being rotatable for axial displacement relative to said nozzle holder, said axial rotative displacement of said first adjusting threaded member causing a change in the setting load of said first spring; a second spring accommodated within said internal space of said first adjusting threaded member; a second movable spring seat accommodated within said internal space of said first adjusting threaded member and supporting said second spring, said second movable spring seat extending in part through said another end of said first adjusting threaded member facing toward said injection nozzle; a second adjusting threaded member threadedly fitted in said open end of said internal space of said first adjusting threaded member in a manner rotatable relative thereto for axial displacement and urging said second spring, said axial rotative displacement of said second adjusting threaded member causing a change in the setting load of said second spring; said second movable spring seat being urged by said second spring in a direction toward said injection nozzle, said second movable spring seat having one end disposed in facing relation to said first movable spring seat and adapted to have said one end spaced from said first movable spring seat by a predetermined gap when said nozzle needle is in a seated position thereof, said second spring and said second movable spring seat being so disposed that said first and second springs have a combined force thereof acting upon said nozzle needle when said nozzle needle is lifted beyond said predetermined gap, whereby said first spring has a setting load thereof adjustable by rotation of said first adjusting threaded member, while said second spring has a setting load thereof adjustable by rotation of said second adjusting threaded member; and a shim arranged within said internal space of said first adjusting threaded member and interposed between said second movable spring seat urged by said second spring and a seating surface formed in said internal space to determine a position of said second movable spring seat relative to said first movable spring seat, which is assumed when said nozzle needle is in said seated position thereof, said shim having a thickness selected as a function of the difference between the distance between a predetermined point on said first movable spring seat in a position assumed when said nozzle needle is in said seated position thereof, and a predetermined point on said first adjusting threaded member and the length of a predetermined portion of said second movable spring seat so that said predetermined gap is provided between said first movable spring seat and said second movable spring seat; whereby lifting of said nozzle needle from said seated position thereof causes corresponding lifting of said first movable spring seat against the force of said first spring through a lift determined by said predetermined gap to effect an initial injection, and further lifting of said nozzle needle causes further corresponding lifting of said first movable spring seat to urge said second movable spring seat against the combined force of said first and second springs to lift said second movable spring seat to effect a main injection.

2. The fuel injection valve as claimed in claim 1, wherein said first adjusting threaded member includes an extension extending integrally from an end of said internal space facing toward said injection nozzle into said nozzle holder and having a free end thereof disposed in urging contact with said first spring.

3. The fuel injection valve as claimed in claim 1, wherein said shim has a thickness equal to the sum of the difference between the distance between said seating surface in said internal space of said first adjusting threaded member and an end face of said first movable spring seat in said seated position thereof facing toward said second movable spring seat and the length of a portion of said second movable spring seat extending from a surface thereof disposed in contact with said shim to an end thereof facing said first movable spring seat, and said predetermined gap between said first movable spring seat and said second movable spring seat.

4. The fuel injection valve as claimed in any one of claims 1, 2 or 3, wherein said second movable spring seat comprises a rod portion and an enlarged spring seating portion formed integrally with said rod portion, said enlarged spring seating portion being disposed within said internal space of said first adjusting threaded member and urged by said second spring against an end wall of said internal space facing toward said injection nozzle, said rod portion extending through said end wall of said internal space and having a free end disposed in facing relation to said first movable spring seat.

* * * * *

UNITED STATES PATENT AND TRADEMARK OFFICE
CERTIFICATE OF CORRECTION

PATENT NO. : 4,448,356
DATED : May 15, 1984
INVENTOR(S) : Nobuyuki NAKAJIMA, et al It is certified that error appears in the above-identified patent and that said Letters Patent is hereby corrected as shown below:

COLUMN 2, lines 20-21, after "spring seat" change "engaged" to --engaging--;

COLUMN 4, line 3, after "bore" change "15a" to --15a'--;

COLUMN 4, line 15, after "extension" change "15c" to --15a--.

Signed and Sealed this

Twenty-second Day of January 1985

[SEAL]

Attest:

DONALD J. QUIGG

Attesting Officer    Acting Commissioner of Patents and Trademarks